A. ROESCH.
INDICATING AND RECORDING INSTRUMENT.
APPLICATION FILED APR. 7, 1917.
1,313,333.
Patented Aug. 19, 1919.
2 SHEETS—SHEET 1.
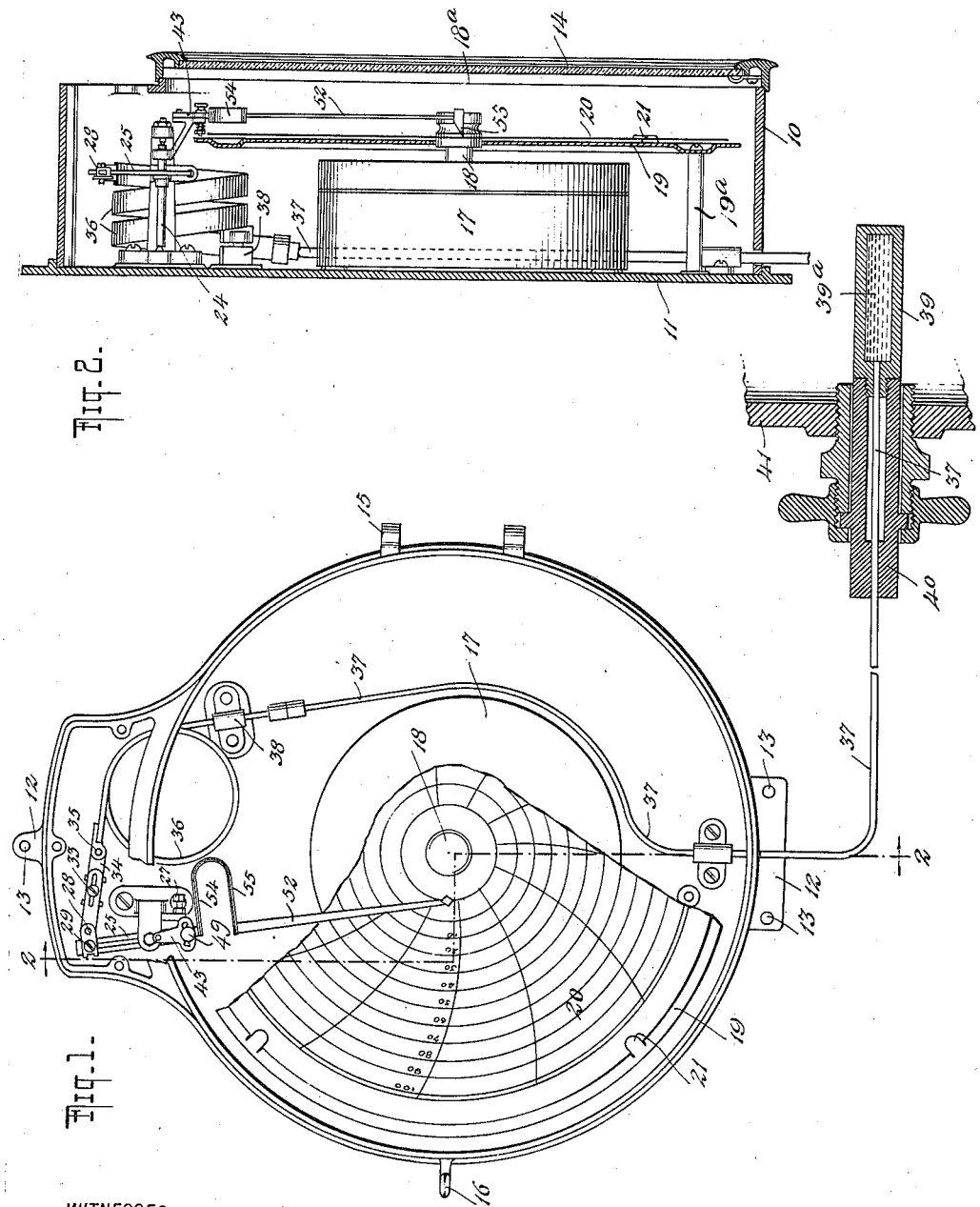
WITNESSES
INVENTOR
Alfred Roesch
BY
ATTORNEYS

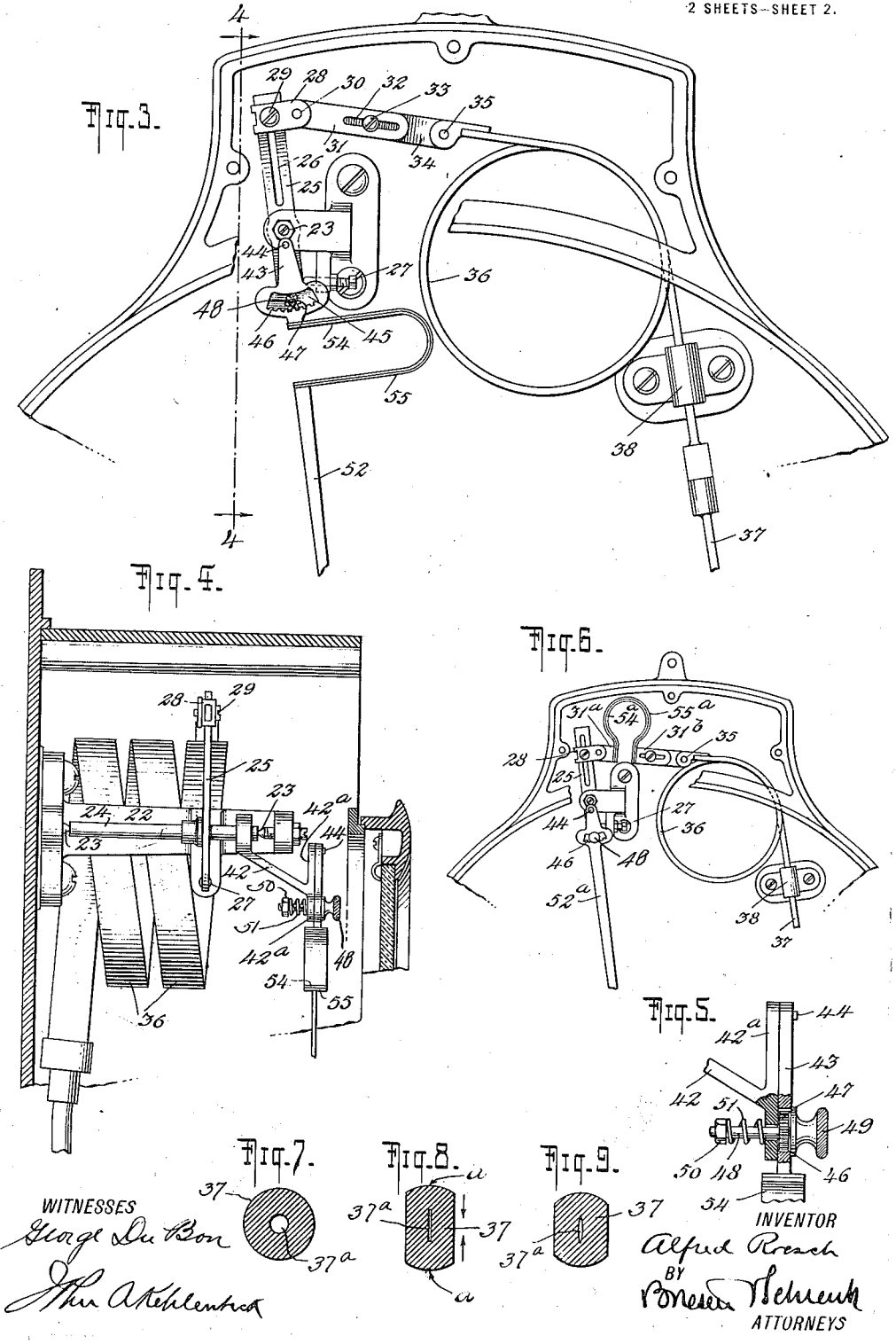

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

INDICATING AND RECORDING INSTRUMENT.

1,313,333.    Specification of Letters Patent.    Patented Aug. 19, 1919.

Application filed April 7, 1917. Serial No. 160,352.

*To all whom it may concern:*

Be it known that I, ALFRED ROESCH, a citizen of the United States, and resident of the borough of Brooklyn, county of Kings, city and State of New York, have invented certain new and useful Improvements in Indicating and Recording Instruments, of which the following is a specification.

My invention relates to indicating and recording instruments and more particularly to that type of such instruments which are intended to indicate and record temperatures and has for its object to provide a simple construction whereby changes in temperature at a given point are efficiently indicated and recorded. My invention also contemplates the provision of an improved capillary tube whereby temperature changes are accurately indicated and recorded regardless of the location of my improved instrument relatively to the point at which said temperature changes occur. A further object of my invention is to provide an improved compensation arrangement whereby the pen arm and stylus will automatically maintain their correct relation to the usual record sheet or chart. In addition to the above my invention provides an improved arrangement for mounting the pen arm and stylus and for adjusting it relatively to said chart. My invention will be fully described hereinafter and the features of novelty will be pointed out in the appended claims.

Reference is to be had to the accompanying drawings which illustrate examples of my improvement and in which Figure 1 is a face view of my improved instrument with parts broken away, the thermometer which is connected with said instrument being shown in section; Fig. 2 is a sectional view on the line 2—2 of Fig. 1; Fig. 3 is an enlarged detail face view of the upper portion of my improved instrument; Fig. 4 is a detail section on the line 4—4 of Fig. 3; Fig. 5 is a detail view of the pen arm adjusting means; Fig. 6 is a detail face view showing a different form of my improvement and Figs. 7, 8 and 9 are cross sections of the capillary tube at successive stages in its construction.

As shown in the illustrated example, the instrument comprises a casing 10 of any suitable construction and arrangement, mounted upon or carried by a back plate 11 which is provided with lugs 12 having suitable apertures 13 for the accommodation of screws or other fastening devices whereby the instrument may be secured upon any convenient support. The front of the casing 10, as shown, may comprise a transparent door 14 hinged at 15 to said casing and locked in its closed position by means of a suitable catch 16. Within the casing 10 is located the customary clock work 17, the spindle 18 of which projects through a disk 19 carried by supports 19ª suitably secured to the back plate 11. This disk 19 serves as a support for the customary chart 20 which is mounted upon the spindle 18 and secured thereon by means of the screw 18ª, said chart being guided by means of lugs 21 formed on the disk 19. As so far described, the arrangement may correspond to any well known construction.

A bracket 22 is secured at a proper point in the upper portion of the casing 10 and is provided with spaced bearings 23 in axial alinement with each other and between which a shaft 24 is journaled, one of said bearings preferably being adjustable as shown in Fig. 4. The shaft 24 carries a member 25 which extends above and below said shaft and has its upper portion slotted as indicated at 26 and its lower end in registry with an adjustable stop 27 carried by the bracket 22. A block 28 is slidable lengthwise of the slot 26 and is secured in an adjusted position upon said member 25, for instance by means of a screw 29, said block 28 in turn being pivotally connected at 30 with a member 31. The latter is provided with a slot 32 for the accommodation of a screw 33 whereby the member 31 is adjustably combined with a second member 34, said members 31 and 34 together comprising an adjustable link pivotally connected at 35 with the coil or active portion 36 of the capillary tube 37 which is, generally speaking, constructed of a suitable metal. A bracket 38 mounted in the casing 10 supports the coil 36 in operative position. The tube 37 communicates in the usual manner with a bulb 39 carried in the customary way by a support 40 adapted to connect the bulb 39 with the element 41 in which the temperature changes are to be indicated and recorded or to support it at the point where such changes take place.

The arm 25, block 28 and adjustable link 110

31, 34 provide a means whereby the pen arm or stylus may be properly adjusted to the scale range of the particular chart which is being used. In order to maintain the pen and pen arm in proper coöperative relation to the scale or to the zero point or other arbitrary division thereof and to make it possible to correct the instrument when necessary, I provide a member 42 which is secured upon the shaft 24 and depends therefrom at an incline toward the front of the casing, the free end of said member 42 carrying a transverse member 42ª which preferably forms an integral part thereof. A pen arm section 43 lies in surface engagement with said member 42ª and is pivotally connected therewith at 44, said section 43 being provided with a curved slot 45 which extends transversely of said section 43 in an arc which has the pivot 44 as a center. One of the walls of said slot, the lower one in the illustrated example, is formed with gear teeth 46 which mesh with a pinion 47 carried by a shaft 48 which is journaled on and extends through the section 42ª. The shaft 48 at one end is provided with an operating head 49 and at its other end is screw-threaded for the accommodation of a nut 50 which forms an abutment for one end of a coil spring 51, the other end of which engages the member 42ª.

In the illustrated example the section 43 is connected with one leg of a compensating member, the other leg of which is secured to the pen arm 52 of any customary and suitable type and carrying the usual stylus or pen 53. The compensating member above referred to consists of thermostatic laminæ or, in other words, is constructed of an inner strip of brass 54 and an outer strip of steel 55 combined in surface engagement with each other in any suitable way. In some cases the pen arm may comprise a continuation of the section 43 as shown at 52ª in Fig. 6; in this case the compensating device may be omitted or it may be located, for instance, as shown in Fig. 6. With this arrangement, the link member 31 is divided into two portions 31ª and 31ᵇ each of which is connected with a leg of the compensating device, which in this case may also comprise an inner strip of brass 54ª and an outer strip of steel 55ª combined in surface engagement with each other.

It will be noted that in my improved construction the mechanism whereby the pen arm is actuated is located at the upper portion of the casing 10 so that said pen arm 52 depends therefrom into coöperative relation with the chart 20 and does not extend upwardly from said mechanism as is usually the case. With this arrangement the ink is supplied to the pen 53 in the direction in which it naturally flows from said pen during preventing waste and blotting and soiling of the parts. The movements of the pen arm occasioned by the actuation of the coil 36 are also more easily brought about and the degree of friction between adjacent parts is reduced to a minimum.

With the construction so far described, an adjustment of the pen arm 52 with respect to the scale range of the chart 20 may be obtained by adjusting the block 28 on the arm 25 or by adjusting the members 31 and 34 relatively to each other or by both means. An adjustment of the arm 52 relatively to the zero point or other arbitrary division of the scale may be had by rotating the head 49 and with it the pinion 47 and shaft 48 which swings the section 43 and arm 52 in one direction or the other on the pivot 44 according to the direction of rotation of the head 49. At the same time the compensating device, owing to the different co-efficients of expansion of the brass strip 54 or 54ª and steel strip 55 or 55ª will maintain said arm 52 in its adjusted relation to the chart 20 regardless of any temperature changes which may take place in the instrument or at its place of location.

It will be understood that the instrument is operated in the usual manner by means of the expansion and contraction of the mercury 39ª in the bulb 39 and capillary tube 37. Owing to the degree of pressure which the tube 37 in practice is called upon to resist, the walls of said tube are necessarily considerably thicker in cross section than the bore of the tube. Because of difficulties encountered in manufacturing it has heretofore been impossible to reduce the cross sectional dimension of said bore sufficiently to produce accurate temperature records, if the instrument is located at any distance from the bulb 39. This is due to the comparatively large volume of mercury contained in the capillary tube of ordinary construction, which throughout its length may be subjected to varying temperatures which affect said mercury and thus interfere with the action of the instrument. Many attempts have been made to bring about the necessary reduction of the bore, without, however, giving entirely satisfactory results. In consequence, very unsatisfactory and inaccurate records have been obtained in attempts to separate the recording instrument any considerable distance from the bulb 39. In order to overcome these serious objections and disadvantages and to provide an instrument which is efficient at all times, regardless of its location relatively to the bulb and which is extremely sensitive, I have provided a capillary tube in which the bore is reduced to a minimum and have further provided an improved method of making said tubing easily In carrying out my improved process I first produce an ordinary tube 37 of circular cross section and having a bore 37ª of sufficiently large diameter to make it easy to produce, as shown in Fig. 7. The tube 37 is then flattened out in any suitable manner as for instance by passing it between a pair of suitable rollers which deforms the bore 37ª from a circular form in cross section to an elongated flattened form, as shown in Fig. 8, said bore, as a matter of fact, being substantially closed by this operation. In this condition pressure or any other force may be applied to the surfaces $a$ in the directions indicated by the arrows in Fig. 8 whereby the bore 37ª is again slightly opened to, for instance, approximately two one-thousandths of an inch as shown in Fig. 9, and is thus of the smallest possible dimensions.

Instead of subjecting the tube to a second pressure or other force to open up the bore, the tube, after being brought to the condition shown in Fig. 8, may be heated and then plunged into cold water. The sudden chilling of the metal will cause the same to contract and open up the bore to a slight extent in approximately the same way as previously described.

The original bore is readily produced owing to its size, as shown in Fig. 7, and may be easily brought to its final stage by successive deformations of the tube in directions transverse to each other, or by first heating the metal and then chilling it, or by any other suitable method.

The operation results in a capillary tube 37 having a bore 37ª of the smallest dimensions and yet uniform throughout, and which for a tube of given length contains only a minimum quantity of mercury 39ª. Thus, no matter how far the instrument is removed from the bulb 39 or how great the length of the tube 37, the interference by intermediate temperature variations will be so small as to be of no consequence and without effect on the operation of the instrument. Accurate and efficient indicating and recording are thus always assured.

Various changes in the specific form shown and described may be made within the scope of the claims without departing from the spirit of my invention.

I claim:

1. An instrument of the kind described comprising a casing, a movable chart therein, a coil, a capillary tube connected with said coil, a pen arm coöperating with said chart to produce a record and a compensating device bodily movable as a unit relatively to said casing and having spaced members connected at one end and comprising laminæ of metals having different co-efficients of expansion, the free end of one of said members of the compensating device being connected with the coil and the free end of the other member of said compensating device being connected with the pen arm.

2. An instrument of the kind described comprising a casing, a movable chart therein, a coil, a capillary tube connected with said coil, a shaft journaled in said casing, a pen arm carried by said shaft, a member carried by said shaft, a compensating device bodily movable as a unit relatively to said casing and bent upon itself to form two legs spaced from each other and comprising laminæ of metals having different co-efficients of expansion, a connection from the free end of one of said legs to said coil and a connection from the free end of the other of said legs to said shaft member.

3. An instrument of the kind described comprising a casing, a movable chart therein, a coil, a capillary tube connected with said coil, a shaft journaled in said casing, an operative connection between said shaft and said coil, a member depending from said shaft, a pen arm pivotally connected with and extending beyond said member, a toothed sector forming part of said pen arm, a pinion mounted on said member and meshing with said sector, and means whereby said pinion is rotated to pivotally and adjustably swing said pen arm relatively to said member.

4. An instrument of the kind described comprising a casing, a movable chart therein, a coil, a capillary tube connected with said coil, a shaft journaled in said casing, a member carried by said shaft, a block adjustably mounted on said member, an adjustable connection between said block and said coil, a member depending from said shaft, a pen arm pivotally connected with and extending beyond said depending member, said pen arm having a transverse slot, a sector of teeth in said slot, a pinion located in said slot in mesh with said teeth, a shaft carrying said pinion and journaled on said depending member and an operating head whereby said shaft and pinion are actuated to pivotally and adjustably swing said pen arm relatively to said depending member.

In testimony whereof I have hereunto set my hand.

ALFRED ROESCH.